United States Patent [19]
Robert et al.

[11] Patent Number: 6,118,838
[45] Date of Patent: *Sep. 12, 2000

[54] FRAME-HELD NEUTRON-ABSORBING FUEL ROD ASSEMBLY STORAGE RACK

[75] Inventors: Jean Robert, La Chapelle-sur-Erdre; Bernard Kopecky, Nantes, both of France

[73] Assignee: Société Atlantique de Techniques Avanceés, Carquefou, France

[ * ] Notice: This patent issued on a continued prosecution application filed under 37 CFR 1.53(d), and is subject to the twenty year patent term provisions of 35 U.S.C. 154(a)(2).

[21] Appl. No.: 09/018,044

[22] Filed: Feb. 3, 1998

[30] Foreign Application Priority Data

Feb. 10, 1997 [FR] France ................................ 97 01487

[51] Int. Cl.$^7$ .......................... G21C 19/06; G21C 19/07; G21F 5/008; G21F 5/012
[52] U.S. Cl. ...................... 376/272; 376/287; 250/506.1; 250/507.1
[58] Field of Search .................................. 376/272, 287; 250/506.1, 507.1

[56] References Cited

U.S. PATENT DOCUMENTS

| | | | |
|---|---|---|---|
| Re. 31,661 | 9/1984 | Mollon | 376/272 |
| 4,567,015 | 1/1986 | Bosshard | 376/272 |
| 4,746,487 | 5/1988 | Wachter | 376/272 |
| 4,781,883 | 11/1988 | Daugherty et al. | 376/272 |
| 5,629,964 | 5/1997 | Roberts | 376/272 |

FOREIGN PATENT DOCUMENTS

| | | |
|---|---|---|
| 0 175 140 | 3/1986 | European Pat. Off. . |
| 2 523 359 | 9/1983 | France . |
| 2 680 909 | 5/1993 | France . |
| 27 30 850 | 1/1979 | Germany . |

OTHER PUBLICATIONS

AAR Brooks & Perkins, Nucl. Eng. Int., p. 55., Dec. 1988.

*Primary Examiner*—Charles T. Jordan
*Assistant Examiner*—Jack Keith
*Attorney, Agent, or Firm*—Pollock Vande Sande & Amernick

[57] ABSTRACT

A nuclear fuel rod assembly storage rack comprises a rigid structure delimiting vacant spaces of square, cross-section and neutron-absorbing units also having a square cross-section prearranged before introduction into all or part of the vacant spaces between the shroud tubes. Each neutron-absorbing unit is made up of four flat plates of neutron-absorbing material, surrounded by at least two support grids. The support grids may comprise two units assembled together, for example by welding.

35 Claims, 5 Drawing Sheets

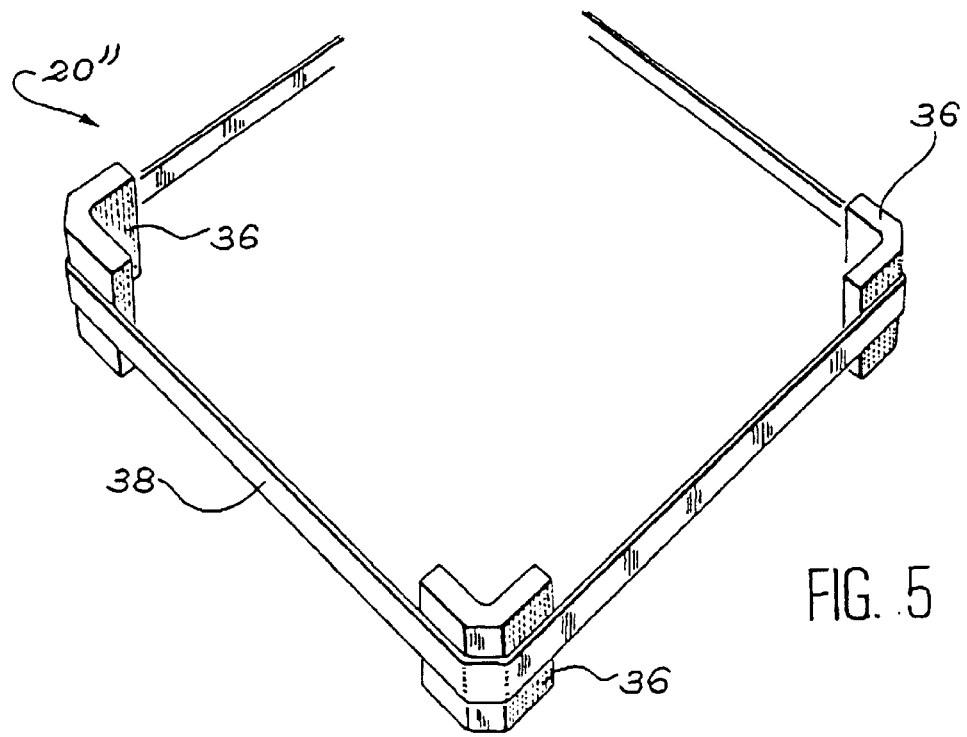
FIG. 5
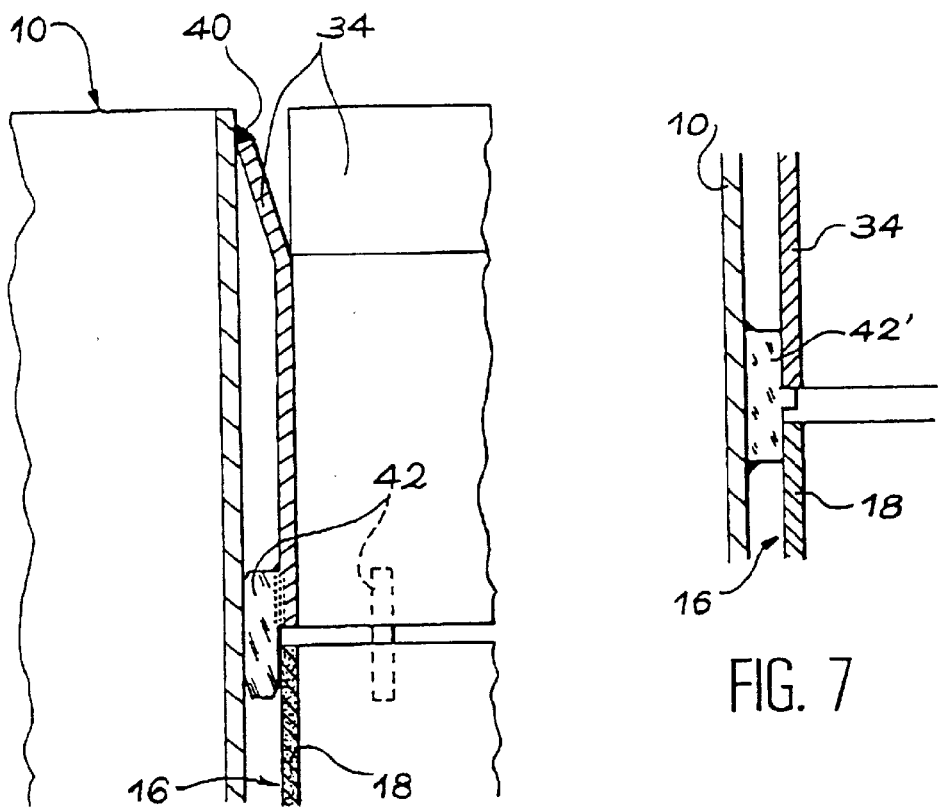
FIG. 6
FIG. 7

FRAME-HELD NEUTRON-ABSORBING FUEL ROD ASSEMBLY STORAGE RACK

DESCRIPTION

1. Technical Field

The invention concerns a storage rack designed to receive new or previously spent nuclear fuel rod assemblies from a nuclear reactor.

Throughout the text, the expression "storage rack" refers to a structure of any shape or size, fixed or movable, suitable for receiving a varying number of new or spent nuclear fuel rod assemblies.

2. Technical Status

In the nuclear industry, the fuel rod assemblies which constitute the nuclear energy source, must frequently be stored. Such storage may be necessary not only when the rod assembly is new, but also when irradiated in the reactor core. In the first case storage may be necessary on the manufacturing site as well as in the nuclear plant. After irradiation the rod assemblies may be stored at the plant, then on a distant location, such as a reprocessing site.

When the nuclear rod assemblies have to be stored, they are usually placed in immersed storage racks in pools. More specifically, a storage rack can generally receive several dozen nuclear fuel rod assemblies, each of which is placed in a cavity or separate vertical, more or less square "cell". It is of course possible to place several racks in the same pool as the number of cavities varies, depending on the racks as does their external shape.

The main function of nuclear fuel rod assembly storage racks is to allow the storage of as many rod assemblies as possible in a given space. This means reducing the distance between adjacent cavity gaps to a maximum.

So that the reduced space which separates the nuclear fuel rod assemblies from each other is compatible with criticality requirements, the storage racks usually comprise walls in what is called "a neutron-absorbing material" between adjacent cavities. This material can notably be in boron stainless steel generally between 0 and 2%.

Moreover, the storage racks must keep their integrity over a period of about forty years, similar to nuclear plants. They therefore must show sound resistance to pure or boron-concentrated water corrosion, excellent sizing and structural stability under radiation, as well as having acceptable aseismic properties.

However, whilst neutron-absorbing materials are usually corrosion-resistant and are very stable under radiation, they are very susceptible to bending, welding, or riveting assembly operations, etc. In fact the specific consequences of these assembly operations is the formation of cracking and residual stress, as well as grain boundary boride migrations, harmful to mechanical and corrosion resistance.

Difficulties in manufacturing these racks due to their very considerable compactness add to these problems; especially as assembly of the different components that make up a storage rack is particularly difficult to achieve. In fact it is practically impossible to carry out assembly operations of the welding or riveting type inside already constituted cavities without using tooling and particularly complex and expensive procedures.

In the FR-A-2 680 909 document the construction of a nuclear fuel rod assembly storage rack by latticework linking of more or less square tubes has been suggested. For this purpose link arms are welded on to the outside walls of these tubes. As soon as these tubes are linked together with link arms by welding, flat plates in neutron-absorbing material are put into position in the vacant gaps between the tubes. These plates have extra ribbed edges which are slotted into each other as assembly progresses.

The storage rack, described in the FR-A-2 680 909 document helps to solve the problems stated above. In particular, rack manufacture is enhanced and does not include any neutron-absorbing plate assembly operations harmful to mechanical and corrosion resistance.

Nevertheless, the manufacturing technique of the storage rack described in the FR-A-2 680 909 document remains relatively precarious. In fact the progressive positioning of neutron-absorbing plates during tube welding is difficult.

What is more, the protective water film which separates two fuel rod assemblies in place in the adjacent cavities is very difficult to control. This means giving increased value to this protective film so as to avoid any risk of criticality.

DESCRIPTION OF THE INVENTION

The precise aim of the invention for the nuclear fuel rod assembly storage rack, giving the same advantages as the rack described in the FR-A-2 680 909 document, is to facilitate the manufacturing process and guarantee the presence of a minimum protective water film between adjacent fuel rod assemblies.

According to the invention, this result is obtained by a nuclear fuel rod assembly storage rack with the following features:

a rigid structure, more or less square, delimiting vacant spaces, and more or less square neutron-absorbing panels received in at least certain of the vacant spaces; each panel formed by neutron-absorbing flat plates is surrounded by at least two support grids.

Such a storage rack is manufactured by making the rigid structure and the neutron-absorbing panels separately (without falling back on operations such as bending, welding or riveting), then introducing these neutron-absorbing panels in all or part of the vacant spaces formed in the rigid structure. Thanks to this arrangement, rack manufacture is greatly facilitated.

The presence of neutron-absorbing support grids between the plates and the rigid structure allows maintaining a regular protective water film. In this way one is certain to attain the minimum water film protection requirement and avoid any risk of criticality.

In other respects, the individual nature of these neutron-absorbing panels ensures, in all cases, an efficient support of the neutron-absorbing plates, whatever the manufacturing tolerances of the rigid structure.

The support grids can notably be the rigid frames surrounding the flat plates on at least two different levels. In this case, the rigid frames can be fixed on the neutron-absorbing plate plates running lengthwise to the neutron-absorbing panels, thanks to notches made in the plates.

Each rigid frame can, in this way, be either formed by at least two basic sections linked together by welds, or made in one single block. Rigid fixing of frames on the plates is then achieved respectively by protrusions or locking devices which slot into the notches.

Rigid frames can also be fixed lengthwise according to the position of neutron-absorbing panels by means of links sandwiched between these frames.

In this case, circulation of cooling water is obtained through openings fashioned in the rigid frame.

In another practical lay-out of this invention, which allows reducing the thickness of the water film, especially when the fuel rod assemblies to be stored are spent, and therefore less reactive, each support grid comprises four angle brackets and a flanging device such as a brace or metal fastener surrounding these elements.

A nuclear fuel rod assembly is usually made up of a fuel rod bundle where regular spacing is ensured by grids distributed over the entire length of the assembly. The fuel rods contain fissile pellets located in the central section constituting an active central part of the rod assembly.

In these conditions, the supporting systems are placed preferably more or less at rod assembly grid level when these are received in the rack.

In other respects, the neutron-absorbing panels are conveniently placed only at the level of the central active section of the rod assemblies when these are received in the rack. This feature allows limiting costs of the rack.

A loading funnel can then be placed in each of the vacant spaces above the neutron-absorbing panels to facilitate introduction of rod assemblies in the spaces remaining inside the neutron-absorbing panels.

In another practical design of the invention, each of the neutron-absorbing panels is made up of four flat plates with extra ribbed edges, slotted into each other running lengthwise to the neutron-absorbing panels.

In an advantageous practical design, the rigid structure has more or less square tubes linked together in a chequerboard pattern.

Furthermore, according to a generally recognised arrangement, the vacant spaces remaining on the outer edge of the rack are closed on the outside by sheets welded on the outer face of the shroud tubes.

BRIEF DESCRIPTION OF DRAWINGS

We will now describe a few examples of the various practical forms of the invention by referring to the attached drawings as follows:

FIG. 5: Another practical lay-out of one of the neutron-absorbing plate support grids.

FIG. 6: Horizontal cross-section representing the fitting of a funnel above a neutron-absorbing panel.

FIG. 7: A cross-section similar to FIG. 6 which shows a practical variant; and

DESCRIPTION OF SEVERAL PRACTICAL FORMS OF CONSTRUCTION

Figure 1:
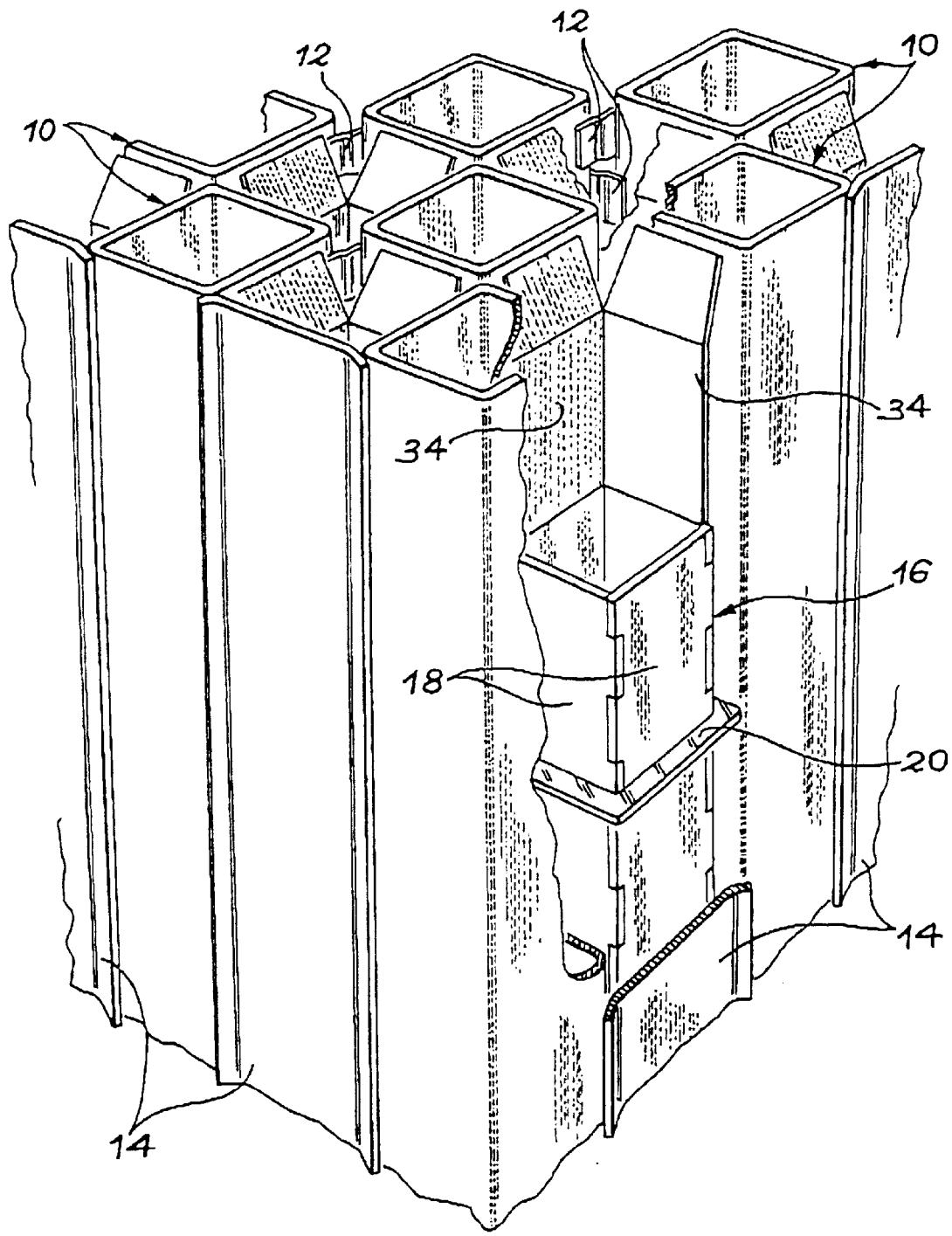
FIG. 1: A perspective view with partial cut-out, which represents a part of the storage rack in keeping with the invention.

In FIG. 1 we have presented a part of a nuclear fuel rod assembly storage rack in keeping with the invention. This part represents more precisely one of the rack upper angles which, overall, takes the shape of a parallelepiped.

The storage rack invention has a rigid structure which delimits vacant spaces or openings that appear square and perpendicular.

In the practical lay-out represented, this rigid structure is made up by the staggered assembly of a certain number of identical shroud tubes (10) which overall appear square. Each of the tubes (10) forms internally a square cavity open at the extremities, to receive directly a nuclear fuel rod assembly.

The shroud tubes (10) are assembled in a staggered lay-out with their long dimensions vertical. The assembly of tubes (10) can be linked in several ways to give a rigid structure and the mechanical resistance required to specifically to ensure seismic rack-integrity.

In the practical lay-out given as an example in FIG. 1, the linking method for shroud tubes (10) uses flat S-shaped arms (12) which are welded to the outer walls of adjacent tubes (10), at different levels all along the height of these tubes.

It should be noted that tube (10) assembly using arms (12) can easily be achieved step by step by welding the arms (12) to the outer walls of the tubes (10) which are still accessible.

The vacant spaces formed between the shroud tubes (10) which appear square, are larger than the cross-section of the cavities inside the tubes for reasons that will appear later.

In order to close the vacant spaces, formed between the tubes (10) on the boundary of the storage rack, sheets (14) are welded to the outside walls of the tubes (10) which delimit these vacant spaces, towards the outside of the rack.

The shroud tubes (10), sheets (14) and arms (12) are preferably made in stainless steel.

The storage rack, in keeping with the invention, comprises in addition neutron-absorbing panels (16) designed to be received in all or several vacant spaces and openings delimited by the rigid structure.

In the practical lay-out represented, only the neutron-absorbing panels (16) are installed in the vacant spaces remaining between the shroud tubes (10). A neutron-absorbing panel (16) more specifically is placed in each of the vacant spaces.

Figure 2:
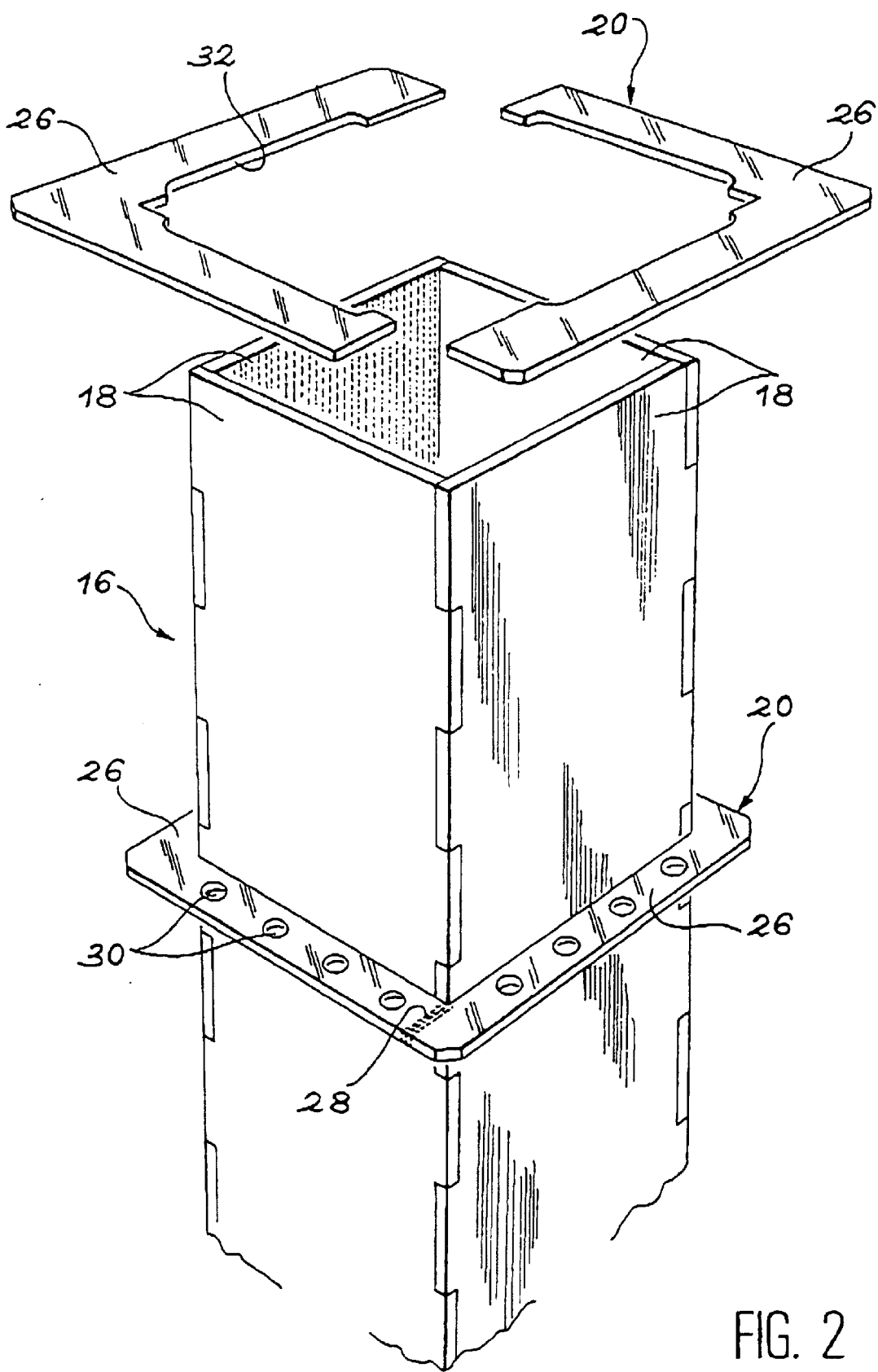
FIG. 2: A perspective view showing one of the neutron-absorbing panels fitted to the rack in FIG. 1 before assembly of one of the rigid frames.

As shown especially in FIG. 2, each neutron-absorbing panel (16) is formed b the assembly of four flat plates (18) in neutron-absorbing material, and at least two support grids (20) around these plates. The support grids (20) can, for example, be made in stainless steel.

The flat plates (18) are preferably all identical, and they are kept together by support grids (20) without any neutron-absorbing panel assembly operation of the bending, welding or riveting type. Assembly is such that the four flat plates (18) of the same neutron-absorbing panel (16) internally delimit a uniformly vertical square cavity where the neutron-absorbing panels (16) are placed in the vacant spaces separating the shroud tubes (10).

In other words, the neutron-absorbing panels (16) are all identical, and each one internally delimits a cavity open at its extremities where the square cross-section is designed to receive a nuclear fuel rod assembly.

In the type of practical lay-out shown in these drawings, the vertical sides of the flat plates (18) extending lengthwise to each neutron-absorbing panel (16) are ribbed with corresponding pattern so as to interlock to form a horizontal square cross-section. This arrangement facilitates fixing the plates (18), in relation to each other, lengthwise to the neutron-absorbing panels (16).

Figure 3:
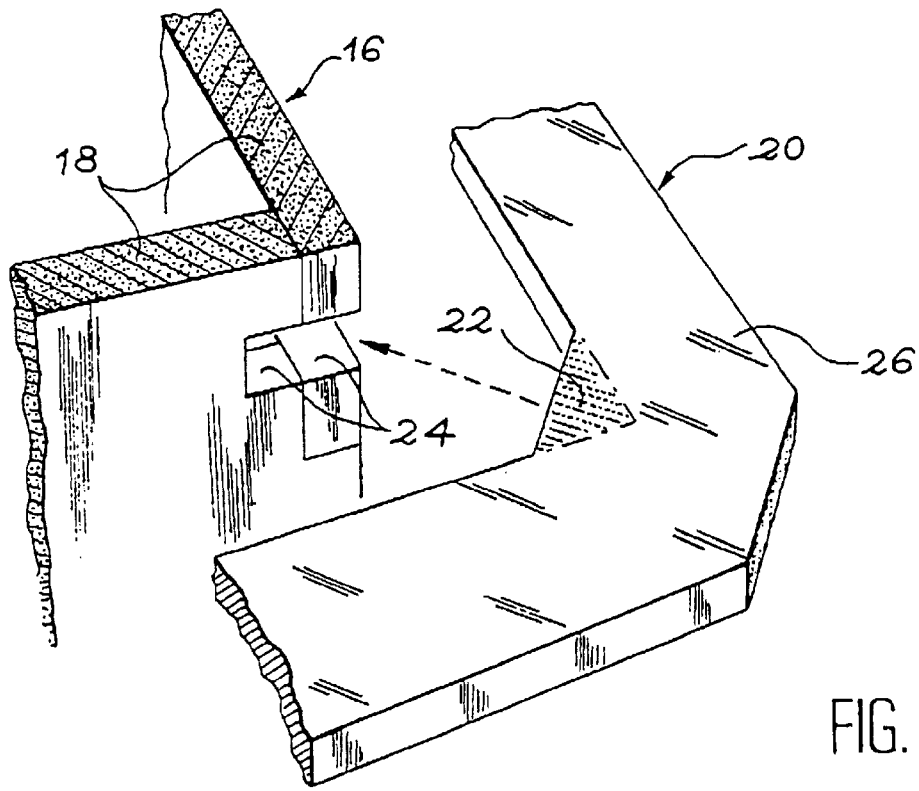
FIG. 3: Detailed view showing the axial locking of a rigid frame on the neutron-absorbing plates.

In the practical lay-out illustrated in FIGS. 1 to 3, each of the support grids takes the form of a rigid frame (20), in stainless steel, and seen from above resembles a hollow square where the external dimensions are so designed to fit in the vacant spaces separating the shroud tubes (10); the internal dimensions coincide with those of the square formed by the horizontal cross-section of the four assembled plates (18). This dimensioning allows the frames (20) to hold the plates (18) together, and at the same time facilities introduction of neutron-absorbing panels (16) in the vacant spaces provided between the shroud tubes (10).

As FIG. 3 shows in greater detail, each grid (20) comprises on its internal circumference one or several protrusions (22) which are designed to fit into notches (24) fashioned in the plates (18). In more detail, a protrusion (22) may notably be provided in one or several of the rigid support grid (20) angles.

The notches (24) are thus formed on the ribbed edges of the plates (18) which extend parallel lengthwise to the corresponding neutron-absorbing panel (16).

In spite of the presence of protrusions (22), each frame is in this way made up of at least two basic sections (26) (FIG. 2), to allow assembly of the rigid grids (20); these sections are linked together at the time of assembling the neutron-absorbing panels (16) so as to make each an individual unit.

More precisely, the basic sections (26) of each rigid grid (20) are joined together by welds (28), for example. Mechanical elements such as bolts, pins, etc. may also be used if the two basic sections of the frame are located in two staggered planes, so as to overlap.

In the practical lay-out shown on FIG. 2, the basic sections (26) of each rigid grid (20) are identical, situated on the same plane and, seen from above, appear as angle brackets. Butt welds (28) which in this case join together the two basic sections (26) of each support grid (20) are for example placed more or less as an outside wall extension of the two parallel plates (18) on the corresponding neutron-absorbing panel (16).

Figure 4:
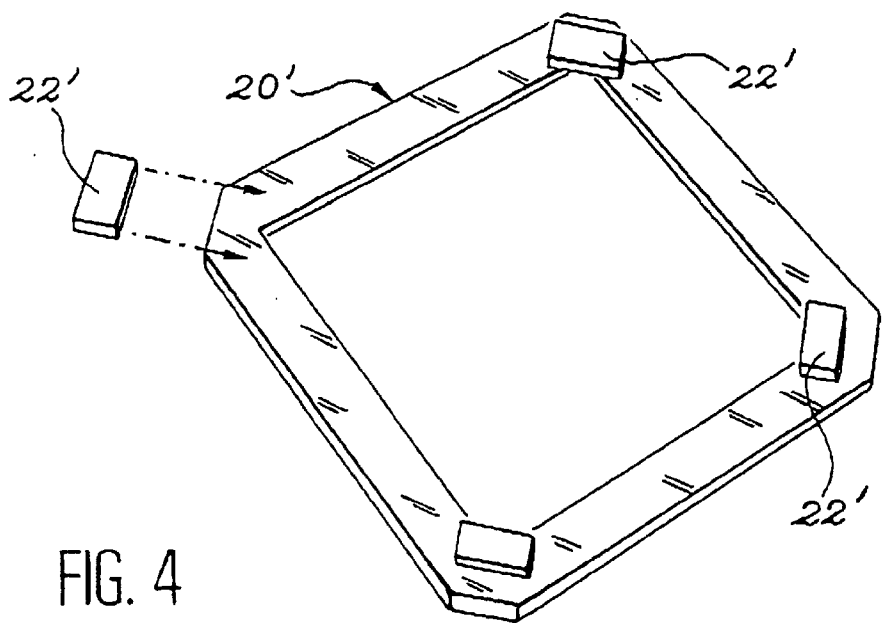
FIG. 4: Perspective view representing a practical variant of the rigid frame.

In a lay-out design variant illustrated in FIG. 4, the support grid (20') is made in one section, as one single unit. Holding the grid (20') in position around the plates (18) in neutron-absorbing material, lengthwise to the neutron-absorbing panel (16) in this case, is ensured by locking devices (22').

These locking devices (22') are inserted in notches fashioned in plates (18) such as the notches (24) in FIG. 3, independently of the positioning of the grid (20') around the plates. Means of assembly (not represented) such as welds, bolts, etc. facilitate fixing the grid (20') on the locking devices (22').

In another practical lay-out shown on FIG. 5, the support grids (20") are made up of four angle pieces (36) on the corners, and by a flanging device (38), such as a brace or metal fastener. Each angle piece (36) is placed on a corner of the square formed in horizontal cross-section by the four plates (18) joined together. The flanging device (38) surrounds the angle pieces (36) in order to press them against the plates (18). Locking can be ensured by any means (crimped clasp, flanging weld (38) on the angle pieces, etc). Holding the support grids (20") thus made up in position lengthwise to the neutron-absorbing panels (16) can be ensured by the degree of tightening on the flanging device (38) or the combination of angle piece (36) protrusions with plate (18) notches as shown in FIG. 3.

Thanks to the various lay-outs that have just been described, the neutron-absorbing panels (16) can be manufactured separately and introduced into the vacant spaces formed between the storage rack shroud tubes (10) when assembly of these tubes with arms (12) or by any other equivalent linking methods is completed. Rack manufacturing time and cost is thus reduced.

When the neutron-absorbing panels (16) are placed in the vacant spaces separating the shroud tubes (10), the support grids (20), (20') and (20") form spacing struts which forge passages of specific width between the outside walls of the tubes (10) and those of the plates (18). When the rack is in service, these passages are filled with cooling water. In the practical lay-outs in FIGS. 1 to 4, these passages form a gap of a few to some dozen millimeters. The design lay-out in FIG. 5 gives even smaller passages which can be suitable for spent fuel storage.

To facilitate cooling water circulation in the passages formed between the shroud tubes (10) and the plates (18) in the practical lay-outs in FIGS. 1 to 4, the support grids (20) comprise openings which can vary in shape, as has been shown as an example at the bottom and top of FIG. 2. In this way, the support grid (20) shown at the foot of FIG. 2 has openings made by circular holes (30) through the grid all around the periphery. In the case of the grid (20) shown at the top of FIG. 2, the openings are notches (32) machined on the inside edge of each grid (20). The openings fashioned in the grid (20) may be of any shape whilst still in keeping with the invention.

As has already been observed, each of the neutron-absorbing panels (16) is made up of at least two support grids (20), (20') and (20") staggered lengthwise. In one of the priviledged practical lay-outs, the number of support grids (20, 20' and 20") matches the same number of grids which equip the nuclear fuel rod assemblies designed to be received in the rack. In the most frequent case where each rod assembly comprises seven grids, the neutron-absorbing panels (16) therefore have seven support grids (20).

Furthermore, the support grids (20) are preferably placed at levels corresponding to those in the nuclear fuel rod assemblies when these rod assemblies are placed in the rack. This feature ensures avoiding that the neutron-absorbing plates (18) are subjected to stress when a rod assembly is placed in the cavity formed inside the neutron-absorbing panel.

As illustrated in FIG. 1, the height of neutron-absorbing panels (16) is, preferably, less than that of the shroud tubes (10). That is to say, the height of the neutron-absorbing panels (16) is usefully limited to the height of the central active part of the nuclear fuel rod assemblies designed to be received in the rack. The top and bottom extremities of each neutron-absorbing panel (16) are thus situated respectively below and above the top and bottom extremities of the shroud tubes (10). This arrangement means reduction in rack cost.

In order to maintain the neutron-absorbing panels (16) at the required level, stops (not represented) can be welded onto the outside walls of the shroud tubes (10) during their assembly.

A base plate, (not represented), may also be placed at the bottom of each vacant space formed between the tubes (10).

In this way a funnel (34) may be usefully placed (FIGS. 1 and 6) in each of the vacant spaces above the neutron-absorbing panel (16) positioned in this space. The funnels (34) ensure a centring and an automatic guiding function for the nuclear fuel rod assemblies when these are introduced into the cavities formed inside the neutron-absorbing panels (16). Each funnel (34) is made, for example, in stainless steel and is square, over most of its length, and is more or less identical to the cavities formed in the neutron-absorbing panels (16). However, each funnel (34) widens progressively in its upper section, where the upper edges are welded in (40) (FIG. 6) on the outside walls of the adjacent shroud tubes (10). This arrangement allows, in practice, play for expansion between the lower edge of the funnel (34) and the upper edges of the neutron-absorbing panel (16) plates (18). Pads (42) previously welded around the funnel (34) lower end ensure centring this extremity and the upper extremity of the plates (18) between the shroud tubes (10).

An alternative method of centring the lower end of the funnel (34) and the upper extremity of the plates (18) may be ensured by pads (42) arranged in tiers, welded beforehand onto the shroud tubes (10) (FIG. 7).

According to the invention, it should be noted that the neutron-absorbing panel (16) plates (18) in the storage rack could, as a variant, comprise upright vertical edges, i.e. not ribbed. Fixing these plates (18) to each other, lengthwise to each neutron-absorbing panel (16) is, in this case, ensured by the support grids (20) which surround these plates. For this purpose, each support grid (20) therefore suitably comprises at least four protrusions (22) fitted in to the notches (24) fashioned in each of the plates (18).

Figure 8:
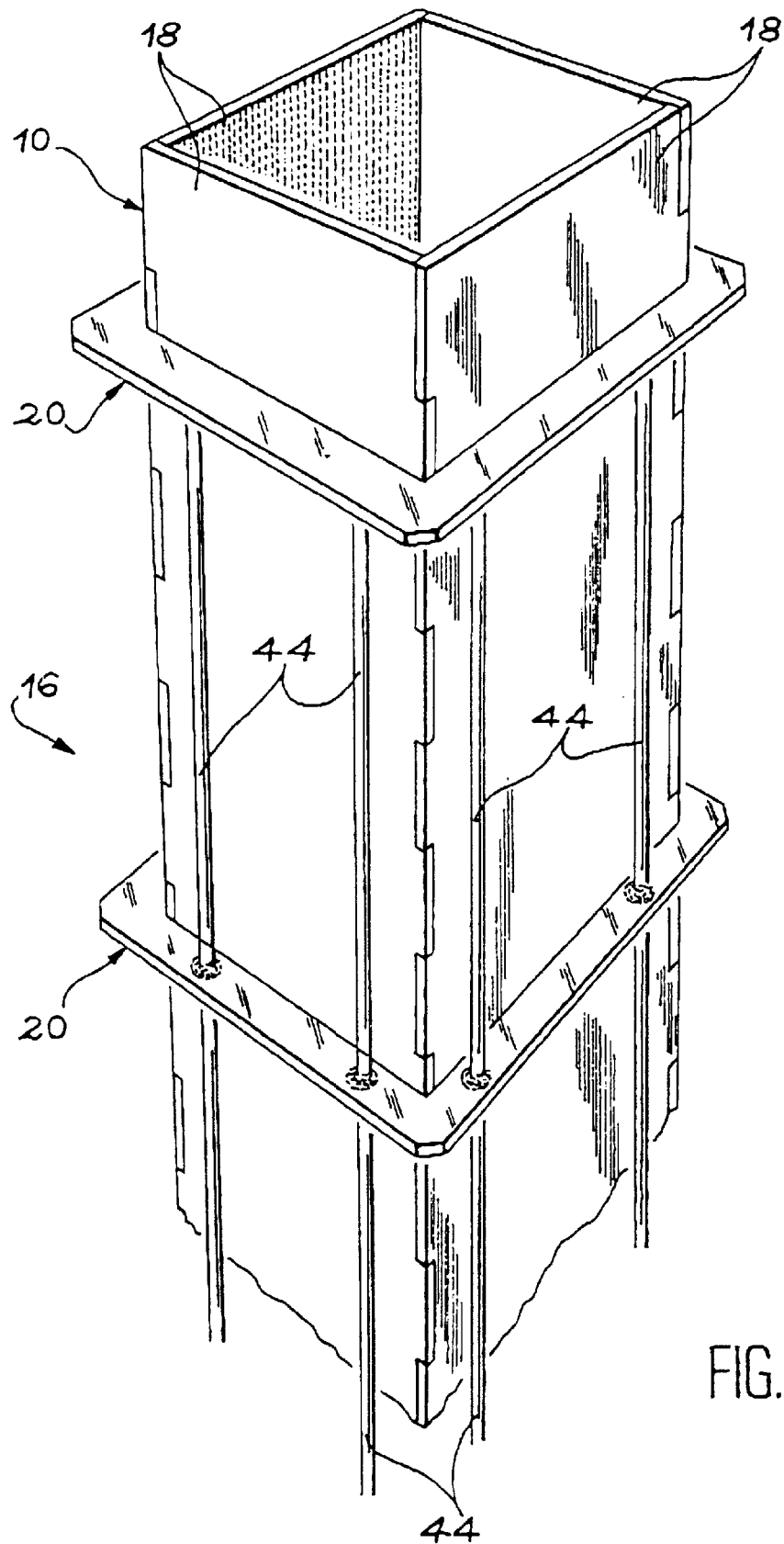
FIG. 8: A perspective view of a practical variant of the rigid frame axial locking system.

As is seen in FIG. 8, the method of fixing the support grids (20) lengthwise to the neutron-absorbing panels (16) may also be achieved by linking the grids (20) to each other by rigid links such as for instance spacing struts (44). These struts (44) placed lengthwise to the neutron-absorbing panels (16) are fixed to the support grids (20) by welds for example. Stops (not represented) may also be welded on the outside walls of the shroud tubes (10) at the time of assembly, to maintain one of these support grids (20) during handling.

Design of the rack according to the invention facilitates prior assembly of the neutron-absorbing panels before fitting in to the vacant spaces formed between the rack tubes (10). Each neutron-absorbing panel thus forms a compact unit completely free-standing vis-à-vis the stainless steel structure in which the rest of the rack is made. The result is time-saving in fitting out the rack, an improvement in quality of manufacture and standardization of the various elements.

The arrangement described also has the advantage of reducing the weight and cost of the rack for only every other cavity is formed by a stainless steel tube.

As we have already seen, the shroud tube (10) assembly may also be made without any problem, specifically by means of arms (12).

Design of the storage rack, according to the invention, also means avoiding any risk of neutron-absorbing plate uncoupling whatever the shroud tube (10) assembly tolerances.

It should be noted, however, that a clever arrangement of support grids (20) prevents application of stresses on the neutron-absorbing plates (18).

Furthermore, it will be seen that the rigid structure in which the neutron-absorbing panels are received may be made in a different way. The neutron-absorbing panels may be distributed within the rigid structure, in a certain arrangement, by occupying a percentage or all the vacant spaces. Note also that in the storage rack previously described as an example, the shroud tubes (10) could be fitted inside with neutron-absorbing panels equipped or not with grids.

What is claimed is:

1. A nuclear fuel rod assembly storage rack comprising:
   (a) a rigid structure delimiting vacant spaces having a substantially square cross-section; and
   (b) a plurality of neutron-absorbing units having substantially square cross-sections, received in at least some of said vacant spaces;
   (c) each neutron-absorbing unit comprising a plurality of flat plates of neutron-absorbing material surround by at least two support means adapted to keep said plates together;
   (d) in which the support means are rigid frames surrounding the flat plates on at least two different levels;
   (e) in which the rigid frames are locked on said flat plates, lengthwise to said neutron-absorbing units, by notches formed in the flat plates; and
   (f) in which each rigid frame comprises at least two basic sections connected together by assembling means and having protrusions which fit into said notches.

2. A nuclear fuel rod assembly storage rack comprising:
   (a) a rigid structure delimiting vacant spaces having a substantially square cross-section; and
   (b) a plurality of neutron-absorbing units having substantially square cross-sections, received in at least some of said vacant spaces;
   (c) each neutron-absorbing unit comprising a plurality of flat plates of neutron-absorbing material surrounded by at least two support means adapted to keep said plates together;
   (d) in which the support means are rigid frames surrounding the flat plates on at least two different levels;
   (e) in which the rigid frames are locked on said flat plates, lengthwise to said neutron-absorbing units, by notches formed in the flat plates; and
   (f) in which each rigid frame is made in a single block and engages said notches through locking devices.

3. A nuclear fuel rod assembly storage rack comprising:
   (a) a rigid structure delimiting vacant spaces having a substantially square cross-section; and
   (b) a plurality of neutron-absorbing units having substantially square cross-sections, received in at least some of said vacant spaces;
   (c) each neutron-absorbing unit comprising a plurality of flat plates of neutron-absorbing material surrounded by at least two support means adapted to keep said plates together;
   (d) in which the support means are rigid frames surrounding the flat plates on at least two different levels; and
   (e) in which the rigid frames are locked lengthwise to said neutron-absorbing units by first linking means interconnecting said frames.

4. A nuclear fuel rod assembly storage rack comprising:
   (a) a rigid structure delimiting vacant spaces having a substantially square cross-section; and
   (b) a plurality of neutron-absorbing units having substantially square cross-sections, received in at least some of said vacant spaces;
   (c) each neutron-absorbing unit comprising a plurality of flat plates of neutron-absorbing material surrounded by at least two support means adapted to keep said plates together;
   (d) in which the support means are rigid frames surrounding the flat plates on at least two different levels; and
   (e) in which each rigid frame comprises openings for cooling water circulation.

5. A nuclear fuel rod assembly storage rack comprising:
   (a) a rigid structure delimiting vacant spaces having a substantially square cross-section; and
   (b) a plurality of neutron-absorbing units having substantially square cross-sections, received in at least some of said vacant spaces;
   (c) each neutron-absorbing unit comprising a plurality of flat plates of neutron-absorbing material surrounded by at least two support means adapted to keep said plates together; and (d) in which each support means comprises four angle parts and a tightening device surrounding said parts.

6. The storage rack according to claim 1, in which a funnel is placed in each of the vacant spaces above said neutron-absorbing unit.

7. The storage rack according to claim 1, in which each neutron-absorbing unit comprises four flat plates with complementary ribbed edges interlocking lengthwise to the neutron-absorbing units.

8. The storage rack according to claim 1, in which said rigid structure comprises a plurality of tubes having substantially square cross-sections, assembled together in a checkerboard pattern by linking means.

9. The storage rack according to claim 8, in which said linking means comprises arms welded on the outside walls of each of said tubes.

10. The storage rack according to claim 8, in which the vacant spaces formed on the rack periphery are closed by sheets welded on the external faces of each of said tubes.

11. The storage rack according to claim 8, in which a neutron-absorbing unit is received in each vacant space formed between each of said tubes.

12. The storage rack according to claim 2, in which a funnel is placed in each of the vacant spaces above said neutron-absorbing unit.

13. The storage rack according to claim 2, in which each neutron-absorbing unit comprises four flat plates with complementary ribbed edges interlocking lengthwise to the neutron-absorbing units.

14. The storage rack according to claim 2, in which said rigid structure comprises a plurality of tubes having substantially square cross-sections, assembled together in a checkerboard pattern by linking means.

15. The storage rack according to claim 14, in which said linking means comprises arms welded on the outside walls of each of said tubes.

16. The storage rack according to claim 14, in which the vacant spaces formed on the rack periphery are closed by sheets welded on the external faces of each of said tubes.

17. The storage rack according to claim 14, in which a neutron-absorbing unit is received in each vacant space formed between each of said tubes.

18. The storage rack according to claim 3, in which a funnel is placed in each of the vacant spaces above said neutron-absorbing unit.

19. The storage rack according to claim 3, in which each neutron-absorbing unit comprises four flat plates with complementary ribbed edges interlocking lengthwise to the neutron-absorbing units.

20. The storage rack according to claim 3, in which said rigid structure comprises a plurality of tubes having substantially square cross-sections, assembled together in a checkerboard pattern by second linking means.

21. The storage rack according to claim 20, in which said second linking means comprises arms welded on the outside walls of each of said tubes.

22. The storage rack according to claim 20, in which the vacant spaces formed on the rack periphery are closed by sheets welded on the external faces of each of said tubes.

23. The storage rack according to claim 20, in which a neutron-absorbing unit is received in each vacant space formed between each of said tubes.

24. The storage rack according to claim 4, in which a funnel is placed in each of the vacant spaces above said neutron-absorbing unit.

25. The storage rack according to claim 4, in which each neutron-absorbing unit comprises four flat plates with complementary ribbed edges interlocking lengthwise to the neutron-absorbing units.

26. The storage rack according to claim 4, in which said rigid structure comprises a plurality of tubes having substantially square cross-sections, assembled together in a checkerboard pattern by linking means.

27. The storage rack according to claim 26, in which said linking means comprises arms welded on the outside walls of each of said tubes.

28. The storage rack according to claim 26, in which the vacant spaces formed on the rack periphery are closed by sheets welded on the external faces of each of said tubes.

29. The storage rack according to claim 26, in which a neutron-absorbing unit is received in each vacant space formed between each of said tubes.

30. The storage rack according to claim 6, in which a funnel is placed in each of the vacant spaces above said neutron-absorbing unit.

31. The storage rack according to claim 5, in which each neutron-absorbing unit comprises four flat plates with complementary ribbed edges interlocking lengthwise to the neutron-absorbing units.

32. The storage rack according to claim 5, in which said rigid structure comprises a plurality of tubes having substantially square cross-sections, assembled together in a checkerboard pattern by linking means.

33. The storage rack according to claim 32, in which said linking means comprises arms welded on the outside walls of each of said tubes.

34. The storage rack according to claim 32, in which the vacant spaces formed on the rack periphery are closed by sheets welded on the external faces of each of said tubes.

35. The storage rack according to claim 32, in which a neutron-absorbing unit is received in each vacant space formed between each of said tubes.

* * * * *